United States Patent [19]

Heshmat et al.

[11] Patent Number: 4,671,677

[45] Date of Patent: Jun. 9, 1987

[54] FLUID SEAL WITH SHAFT EXCURSION COMPENSATION

[75] Inventors: Hooshang Heshmat, Niskayuna; Donald F. Wilcock, Schenectady, both of N.Y.

[73] Assignee: Mechanical Technology Incorporated, Latham, N.Y.

[21] Appl. No.: 736,137

[22] Filed: May 20, 1985

[51] Int. Cl.[4] ........................ F16C 32/06; F16C 33/82

[52] U.S. Cl. .................................... 384/124; 384/133; 277/80

[58] Field of Search ............... 384/121, 133, 122, 123, 384/124, 107, 102; 277/80

[56] References Cited

U.S. PATENT DOCUMENTS 3,708,215 1/1973 Wilcock et al. ..................... 384/102

4,335,885 6/1982 Heshmat .............................. 277/80

*Primary Examiner*—Lenard A. Footland

*Attorney, Agent, or Firm*—Joseph V. Claeys; Charles W. Helzer

[57] ABSTRACT

Compensation for shaft excursion in a seal housing is achieved with a fluid film bearing in which bearing fluid is supplied to the bearing region at a pressure and flow rate which depend upon shaft rotational speed. In a disclosed embodiment, the bearing fluid is provided from a centrifugal fluid seal which delivers part of its fluid to the bearing region as a function of centrifugal pressure. A magnetic fluid seal is employed for zero and low speed operation. The shaft includes an annular collar which rotates in an annular cavity formed in a seal cartridge which is rotationally stationary but capable of small axial displacements to compensate for axial shaft displacement. A spring biases the cartridge in opposition to the axial forces of the magnetic fluid seal so as to axially balance the system at zero and low shaft speed operation. Relative axial motion of the shaft and cartridge occuring at high rotational speeds is balanced by the increasing pressure of fluid delivered to the bearing from the centrifugal seal.

21 Claims, 11 Drawing Figures

OIL COOLER
CENTRIFUGAL SEAL OIL RESERVOIR
SUPPLY
P1
$P_H$
$P_L$
A
B
C
N
S
11
12
13
14
15
16
17
18
19
20
21
22
23
24
25
26
27
28
29
30
31
32
33
34
35
36
37
38
39
40
41
42
43
44
45
46
47
48
49
50
51

GAS PRESSURE ON A-A

CENTRIFUGAL FLUID PRESSURE ON C-C

CENTRIFUGAL FLUID PRESSURE ON C-C

HYBRID BEARING PRESSURES ON C-C

HYDROSTATIC BEARING PRESSURE ON C-C

MAGNETIC FORCES ON CARTRIDGE 16

FLUID SEAL WITH SHAFT EXCURSION COMPENSATION

BACKGROUND OF THE INVENTION

1. Technical Field

The present invention relates to a method and apparatus which provide compensation for excursion of a rotary shaft relative to its housing.

More particularly, the invention relates to an improved combined centrifugal and magnetic fluid seal structure in which the centrifugal seal combines with a fluid film bearing by increasing the fluid pressure in the bearing as a function of the centrifugal seal fluid pressure to maintain a proper spacing between a cartridge seal member and a shaft collar.

Still more particularly, the present invention relates to an improvement of the plural fluid magnetic-centrifugal seal described and illustrated in U.S. Pat. No. 4,335,885 (Heshmat), the subject matter of which is expressly incorporated herein in its entirety by this reference. In providing such improvement, the present invention makes use, in part, of the technology of hydrostatic bearings and hybrid (combined hydrostatic and hydrodynamic) bearings described and illustrated in U.S. Pat. No. 3,708,215 (Wilcock et al), the subject matter of which is also expressly incorporated herein by reference in its entirety.

2. Discussion of the Prior Art

There are many applications, such as pumps, compressors, and the like, where hermetic sealing of the rotatable shaft in a non-contacting, non-wearing manner is not only desirable but essential during both zero or low speed operation and during high speed operation. Because of the sealing requirement in high speed applications, and in order to reduce wear, it is desirable that the seal be non-contacting in nature. A prior art seal which meets these requirements is described and illustrated in the aforementioned Heshmat patent. Specifically, the invention described therein relates to a combined centrifugal and magnetic seal structure employing separate, different viscosity fluids for use during separate magnetic seal and centrifugal seal operating modes of the structure, whereby each seal compliments the other at different rotational speeds. The plural fluid seal makes it possible for the design parameters of each stage, although coacting over a complete speed range, to be substantially independent of one another, so that optimized design criteria may be employed in the construction of the two cooperating seals. However, for certain applications, such as with contra-rotating shafts and/or for a rotor with excessive axial motion, the sealing structure disclosed in the Heshmat patent may not fully accomodate the more extreme axial shaft excursions. Consequently, particularly during high speed shaft rotation, the rotating and non-rotating parts may sometimes be brought into contact resulting in increased wear and reduced life of the parts of the seal structure. It is known in the prior art to employ fluid film bearings between mutually rotating parts in order to minimize contact between the parts. There are three primary types of fluid film bearings, namely, the hydrodynamic bearing, the hydrostatic bearing and the hybrid bearing. The hydrodynamic bearing has essentially no limit on its fatigue life. If the bearing materials are chosen to be compatable with the lubricant employed, so that there is an absence of corrosion and chemical attack, and if the bearing design is such that high-speed rubbing contact is avoided during operation, operating life of this type of bearing may be considered to be infinite. However, particularly for applications where the axial thrust load is variable, such bearings experience a period of metal-to-metal rubbing during extreme load variations.

The hydrostatic bearing, like the hydrodynamic bearing, has essentially no limit on its operating life, provided it is designed so that no rubbing occurs during certain periods of operation. However, the hydrostatic bearing, like the hydrodynamic bearing, suffers under conditions where the thrust load is variable over a relatively wide range and may result in metal-to-metal contact and undesirable wear.

The hybrid bearing, which is basically a hydrostatic bearing, has a hydrodynamic capability built into it. This hydrodynamic capability adds additional load capacity.

It is desirable to utilize the fluid film bearing technology in connection with the combined fluid seal structure of the aforementioned Heshmat patent in order to provide an efficient seal combined with compensation for shaft excursion at higher rotational speeds. However, the existing fluid film bearing technology, as described above, is not capable of preventing the undesirable contact and wear between the sealed parts under all operating conditions.

OBJECTS AND SUMMARY OF THE INVENTION

It is therefore a primary object of the present invention to provide a method and apparatus which compensates for shaft excursion in contra-rotating shafts and/or for rotors with excessive axial motion.

It is another object of the present invention to provide a fluid sealed structure between rotating and non-rotating parts, which structure automatically compensates for shaft excursion so as to prevent rubbing and wearing between the parts.

Another object of the present invention is to provide an improved fluid film bearing arrangement which cooperates with a centrifugal fluid seal to increase the fluid pressures between rotating and non-rotating parts as the rotational speed of the rotating part increases.

Still another object of the present invention is to provide an improved method and apparatus for compensating for shaft excursion in a dual fluid seal arrangement of the type described in the aforementioned U.S. Pat. No. 4,335,885 to Heshmat.

In one manner of practicing the present invention an annular collar member is secured to a rotating shaft so as to be rotatable therewith in an annular cavity formed in a sealing cartridge disposed concentrically about the shaft in closely-spaced relation thereto. A magnetic fluid seal is disposed radially closer to the shaft axis than a centrifugal fluid seal, substantially in the manner described in the aforementioned Wilcock et al. U.S. Pat. No. 3,708,215. However, the seal cartridge is axially displaceable over a limited range to accommodate axial displacement of the shaft arising from high thrust loading, or thermal growth of the rotor. Thus, while the seal cartridge is stationary in a rotational sense, it is not stationary in an axial sense. A fluid bearing is defined between first radially extending bearing surface on the rotating collar and a presented surface in the annular cavity. The bearing region drains to the low pressure side of the centrifugal seal. A bearing feed flow passage is connected between the radially outermost portion of the centrifugal seal region and the fluid film bearing region. As the shaft rotational speed increases, the pressure of the centrifugal seal fluid increases and thereby increases the flow of fluid to the bearing region. The resulting increase in pressure in the bearing region prevents the shaft and collar from contacting the sealing cartridge by displacing the cartridge from the axially moving shaft and collar.

The fluid film bearing may be a simple hydrostatic bearing to balance the normally unbalanced gas pressure differential existing axially across the seal. Alternatively, a hybrid bearing may be employed wherein hydrodynamic load supporting elements are inserted within the pressurized areas of the hydrostatic bearing. In this manner, the fluid film bearing serves as a guide for the seal cartridge so that it will follow both positive and negative axial shaft excursion which may occur due to dynamic variation in the thrust bearing or due to differential thermal expansion.

The magnetic fluid seal operates in a conventional manner to provide a seal between the rotating and non-rotating parts at zero and low speed operation. A spring member may be provided to axially bias the cartridge so as to balance the magnetic force exerted on the cartridge during the zero and low speed mode. The centrifugal fluid seal operates in a conventional manner to provide the necessary seal between the rotating and non-rotating parts during high speed operation. The addition of the fluid film bearing, driven by the variable pressure centrifugal seal fluid, provides the necessary axial position compensation at high speed.

BRIEF DESCRIPTION OF THE DRAWINGS

These and other objects, features and many of the attendant advantages of the present invention will be better understood upon reading the following detailed description when considered in conjunction with the accompanying drawings, wherein similar elements in the several figures are identified by the same reference numerals, and wherein.

DESCRIPTION OF THE PREFERRED EMBODIMENTS

Figure 1:
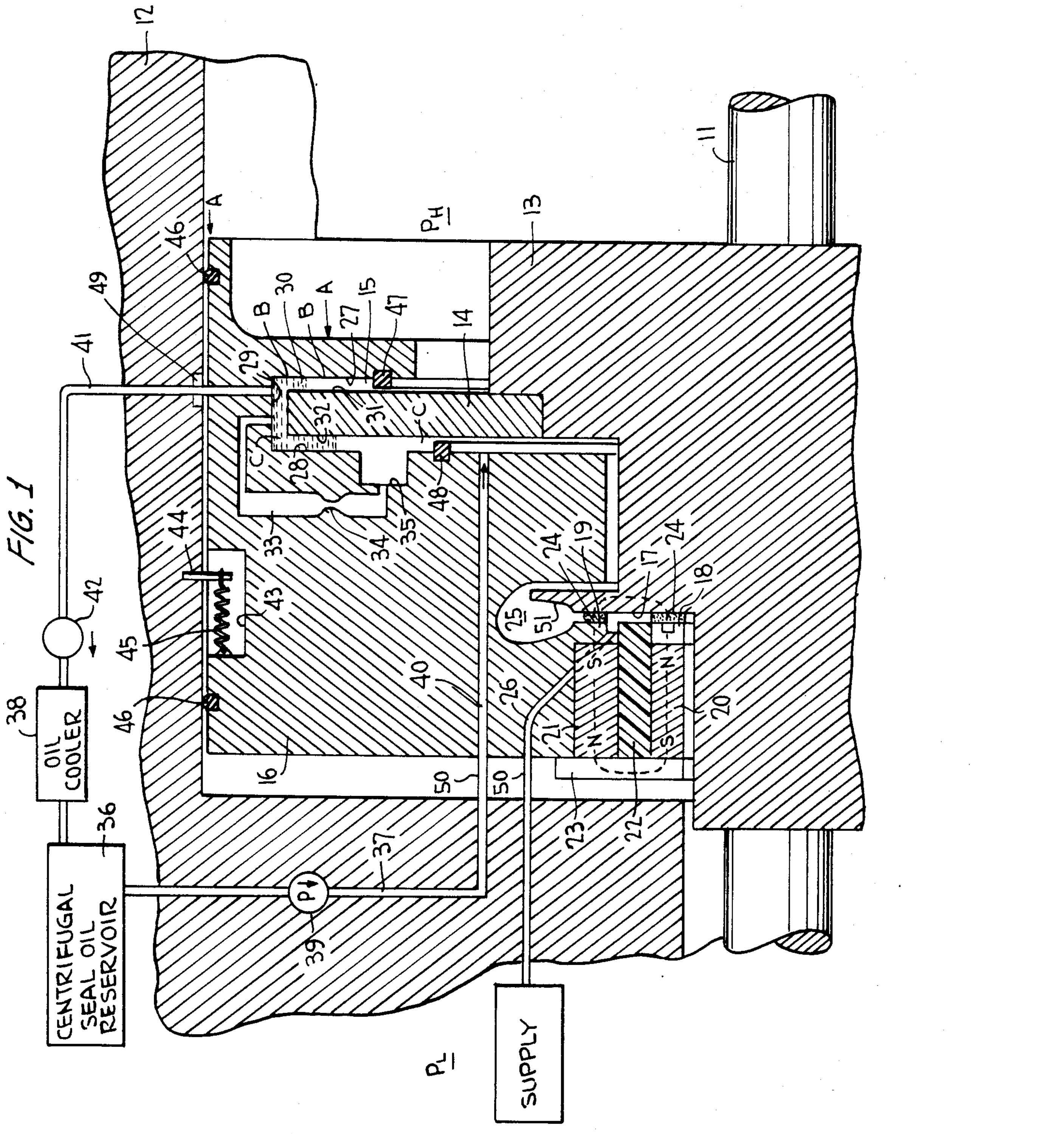
FIG. 1 is a partially schematic, partial sectional view of a new and improved seal structure employing the rotational speed responsive compensation bearing of the present invention and which uses a hydrostatic bearing.

Referring specifically to FIG. 1 of the accompanying drawings, there is illustrated a partial sectional view of a plural fluid seal combined with a speed-responsive fluid film bearing for providing shaft excursion compensation. A shaft 11 is rotatably journaled in bearings (not shown) in a housing or other stationary member, part of which is shown and designated by the reference numeral 12. The shaft 11 includes an annularshaped collar 13 which is keyed or otherwise secured to shaft 11 so as to be rotatable therewith. The collar 13 includes an annular vane portion 14 which is secured to the collar for rotation therewith and projects radially outward therefrom into an outer annular cavity 15. Cavity 15 is formed in an axially movable annular seal cartridge 16 which is disposed substantially concentrically about collar member 13 in closely-spaced relation to the collar member. The vane portion 14 of collar member 13 has a substantially smaller axial thickness than the remainder of the collar member 13 and is closely spaced from the walls of cavity 15 in axially movable seal cartridge 16.

Collar member 13 is made of magnetically permeable material, although the vane portion 14 need not be magnetically permeable. The inner axially thick portion of collar member 13 has a substantially flat annular surface 17 facing a plurality of radially spaced, annular pole-like teeth 18, 19, which are formed in the inner circumferential end of seal cartridge 16 and are in direct contact with respective annular magnets 20, 21. The magnets 20 and 21 are spaced from one another by a magnetically non-permeable ring 22 secured to seal cartridge 16. Magnets 20 and 21 may be permanent magnets or electromagnets but, in either case, they are oppositely poled with respect to their axially facing surfaces; that is, pole-like teeth 18 and 19 are oppositely poled. An annular magnetically permeable stop member 23 is secured to the cartridge 16 in contact with both magnets 20 and 21 at the ends of those magnets opposite the pole-like teeth 18 and 19. Stop member 23 serves to provide a magnetic path between the magnets 20 and 21 at the low pressure side of seal cartridge 16. In addition, stop member 23 prevents seal cartridge 16 from moving axially sufficiently far so as to axially impact the housing 12 due to overloading or axial shock conditions during system operation.

The magnetic pole-like teeth 18 and 19 define a pair of annular close-clearance magnetic gap spaces in which is disposed a magnetically permeable magnetic fluid 24. The magnetic fluid 24 preferably comprises a Diester fluid in which are suspended magnetic particles. Preferably, the magnetic fluid should be immiscible with respect to the centrifugal fluid (described hereafter) and the gaseous atmospheres at pressures $P_H$ and $P_L$. The Diester base ferromagnetic fluid is prefered because of its better temperature characteristics. Magnetic fluid in the magnetic gap spaces between the pole piece teeth 18, 19 and the opposing surface 17 of collar member 13 is exposed to and has access to an enlarged reservoir cavity 25 having the general shape of a light bulb in cross-sectional configuraton but which extends around the entire inner periphery of cartridge 16. The purpose of the reservoir 25 is described hereinbelow in greater detail with relation to the operation of the magnetic fluid seal.

The seal cartridge 16 is preferably fabricated from a non-magnetic material, such as copper, aluminum, or alloys thereof, or may even be made from a plastic material of appropriate physical strength and temperature characteristics. The radially outermost surface of magnet 21 is secured to the radially innermost surface of cartridge 16 at a location on the low pressure side of reservoir 25. A passage 26 is defined in the cartridge 16 and communicates with a supply of the magnetic fluid so that the magnetic fluid may be delivered to the space between the pole pieces 18, 19 and surface 17 of collar member 13.

Outer annular cavity 15 is defined in cartridge 16 on the high pressure side of reservoir 25 at location which is radially outward from magnetic seal 17, 18, 19 and 25. The vane portion 14 of collar member 13 rotates between the opposing radially-extending surfaces 27, 28 of cavity 15 formed in axially movable seal cartridge 16 in spaced relation with respect to those surfaces. The radially outer end of vane portion 14 is also spaced from the radially outer surface 29 of cavity 15. The space which surrounds the vane portion 14 in the cavity between walls 27, 28 and 29 defines a centrifugal seal forming chamber which receives centrifugal sealing fluid generally indicated by the reference number 30. The radially-extending surface 31 of vane portion 14 which faces the high pressure side of the seal is oriented in substantially parallel spaced relation to the cavity surface 27. The opposite radially-extending surface 32 of vane portion 14 is disposed substantially parallel to cavity surface 28 and is in closely spaced relation thereto. Surfaces 28 and 32, as described below, constitute fluid film bearing surfaces for the improved fluid film bearing of the present invention.

One or more flow passages 33 communicate from respective ports defined in the radially outer wall 29 of cavity 15 and the bearing region between surfaces 28 and 32. Flow passage 33 has a pressure-dropping restricter 34 therein to limit the flow and hence the pressure of fluid applied to the fluid bearing. The bearing illustrated in FIG. 1 is a hydrostatic bearing which includes an annular recess 35 defined in surface 28 to receive fluid from passage 33 and distribute it in the bearing region between surfaces 28 and 32.

The centrifugal sealing oil 30 is supplied to the centrifugal sealing region from a lubricating oil reservoir 36 via an oil supply line 37 and a lubricating oil pump 29. This lubricating supply system may be of any known type suitable for supplying cool oil for the bearings and seals. Such known type of lubricating supply systems are used for supplying cool oil to bearings and seals of many different kinds of machines and apparatus. The lubricating supply system delivers oil via conduit 40 and through cartridge 16 to the bearing region between surfaces 28 and 32. Supply line 37 is connected to line 40 in cartridge 16 by a suitable flexible connection 50, such as a sliding seal, bellows, or the like. From the centrifugal seal region, the lubricating oil is bled off through a discharge conduit 41 which receives fluid from a suitably provided aperture in the radially outermost wall 29 of outer annular collar 15 connecting to a recess 49. A back pressure control valve 42 maintains the desired head on the centrifugal seal, and delivers the oil via the cooler 38 to the lubricating oil reservoir 36. It should be noted at this point that this may not be the only return conduit providing for the flow of lubricating oil to reservoir 36.

The outer periphery of seal cartridge 16 is provided with one or more axially extending recess slots 43 into which respective key members 44 project radially inward from the outer housing 12. The angularly narrow slots 43 have axially extending sidewalls which contact the key member 44 so as to preclude rotation of the cartridge 16 with respect to the housing 12 and shaft 11. A compressed helical spring 45 is disposed in each slot 43 with one end secured to the key member 44 and the other end secured to an axial end wall of the slot. Spring 45 inserts a static force on cartridge 16 to balance the magnetic force exerted on the cartridge. The spring constant and particular connections of the spring depend upon the seal construction and the permanent magnets and can be altered to reverse the resultant direction of the spring force. In the embodiment illustrated in FIG. 1, the magnetic seal tends to draw the seal cartridge 16 toward the right; therefore, spring 45 is normally compressed so as to exert an opposite force which tends to push the cartridge to the left.

Seal cartridge 16 rides on secondary seals 46, having the general form of O-rings, disposed between outer housing 12 and suitably provided channels formed in the periphery of the seal cartridge 16. Seals 46 permit the cartridge to follow axial displacement due to thermal or mechanical excursion of shaft 11. In addition, stop members 47, 48 are provided at surfaces 27, 28, respectively, radially inward of the centrifugal seal region to limit displacement of the cartridge 16 and thereby prevent full contact between the opposing surfaces in the centrifugal seal region.

The novel seal and bearing arrangement of the present invention operates in the following manner. At standstill and at low rotational speeds of shaft 11 (i.e., up to about 2000 rpm), the magnetic fluid 24 is retained in the close clearance magnetic gap space between surface 17 of collar member 13 and the pole pieces 18 and 19. While retained in this position, the magnetic fluid 24 forms a multiple stage magnetic seal that hermetically seals the higher pressure region $P_H$ to the right of the structure from the lower or equal pressure region $P_L$ on the lefthand side of the structure. Under these operating conditions, the magnetic fluid 24 is in the condition as shown in FIG. 1.

Thereafter, as the rotational speed of shaft 11 increases, at some point centrifugal force effects cause the magnetic sealing fluid to move radially outward so that it surrounds the outer peripheral edge of the vane portion 14 as shown in FIG. 1. At this point in the operation, it is conceivable that both the magnetic seal and the centrifugal seal can be coexistant for hermetically sealing the space between shaft 11 and the cartridge 16 from the two different pressure atmospheres $P_H$ and $P_L$. If thereafter the rotational speed of shaft 11 is increased further (for example, to a speed of about 10,000 rpm), the centrifugal effects become sufficiently great to force the magnetic fluid 24 into the reservoir 25; in other words, the centrifugal forces overcome the magnetic forces which had held the magnetic fluid in the gap between surface 17 and pole pieces 18, 19. During operation at these speeds, hermetic sealing is provided primarily by the centrifugal seal formed by the centrifugal seal fluid 30 and somewhat by the slinger operation of the magnetic fluid in reservoir 25 caused by the contoured portion 51 of collar member 13 which extends into the reservoir in the manner described in the aforementioned Heshmat patent. It will be appreciated, therefore, that by appropriate tailoring of the relative sealing capacities of the magnetic seal and the centrifugal seal, a distinct overlap can be designed into the seal, thereby assuring that the hermetic sealing in the space between the shaft 11 and the cartridge 16 is always provided.

Figure 5:
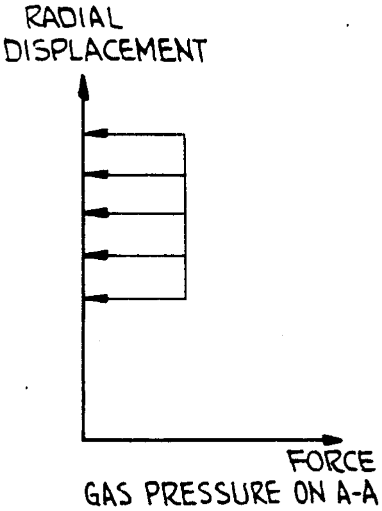
FIG. 5 is a plot of the pressure distribution exerted on the seal cartridge of the present invention by the axial fluid pressure differential existing across the cartridge.
Figure 6:
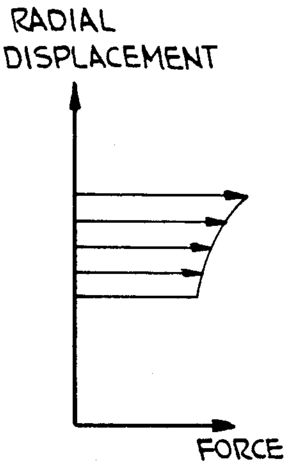
FIG. 6 is a plot of the pressure distribution exerted on the cartridge in the high pressure side of the centrifugal fluid seal.
Figure 7:
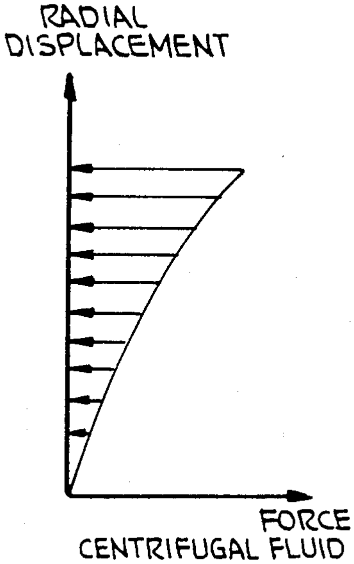
FIG. 7 is a plot of the pressure distribution exerted on the cartridge on the low pressure side of the centrifugal seal.
Figure 8:
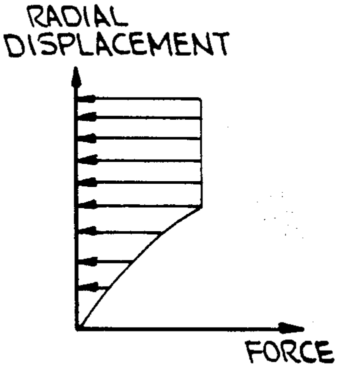
FIG. 8 is a plot of the pressure distribution produced on the seal cartridge by the hydrostatic bearing illustrated in FIG. 1.

As the centrifugal seal develops, the centrifugal forces on the centrifugal seal fluid cause that fluid to flow through passage 33 and be delivered in the bearing region between surfaces 28 and 32 at a flow and pressure which increase with the rotational speed of shaft 11. Specifically, as the rotational speed increases, the centrifugal pressure in the fluid increases, thereby increasing the pressure in the passage 33 so that the fluid pressure in the bearing region in increased. In the particular embodiment illustrated, the compensation bearing region is disposed so as to displace the seal cartrige 16 to the left as illustrated in FIG. 1. It will be appreciated, however, that the bearing region could be located on the opposite side (i.e., the high pressure side) of the centrifugal seal so that increasing speed results in a compensating translation of the seal cartridge 16 to the right. The particular location of the compensation bearing depends upon the net balance of other forces acting on the cartridge during operation. More particularly, as relative axial motion between the shaft and housing occurs, centrifugal forces on the fluid cause a pressure build up which results in the seal cartridge 16 moving toward the high pressure side, in the disclosed embodiment, so that a centrifugal seal is formed and pressurized fluid 30 is tapped via passage 33 to the bearing region between surfaces 28 and 32 on the low pressure side of the centrifugal seal. More particularly, consider the operation of the centrifugal seal with the gas pressure $P_H$ being greater than the pressure $P_L$. This pressure difference is balanced against flow by providing higher centrifugal pressures on the low pressure side of vane portion 14 in the centrifugal seal than on the high pressure side so as to counterbalance the pressure difference. However, the axial static balance across the seal remains and compensation therefor can only be partially attained by the centrifugally-generated fluid pressures. Thus, the seal cartridge 16 is normally forced toward the disk or vane portion 14 on the low pressure side of the vane portion. This situation is graphically illustrated in FIGS. 5, 6, 7, 9 and 10. Specifically, FIG. 5 illustrates the axially-directed pressure distribution exerted along surface portion A—A of FIG. 1 by the gaseous pressure differential exsisting between high pressure region $P_H$ and low pressure region $P_L$. This pressure distribution tends to direct the cartridge toward the left as illustrated in FIG. 1. The pressure distribution on cartridde 16 exerted by the centrifugal seal fluid is illustrated in FIGS. 6 and 7. Specifically, FIG. 6 illustrates the axial forces directed to the right in FIG. 1 along the surface portion designated B—B. FIG. 7 illustrates the pressure distribution due to the centrifugal forces applied on the low pressure side of the centrifugal seal along surface length C—C. The pressure due to the hydrostatic bearing (i.e., the pressure of the fluid delivered to the bearing region via passage 33) is illustrated in FIG. 8 and is also applied to the surface portion C—C of the seal cartridge 16 to effect a leftward displacement. The effect of the magnetic forces from magnets 20 and 21 acting to axially displace seal cartridge 16 is illustrated in the force distribution plot of FIG. 9. These magnetic forces act axially along the exposed portions of the pole members 18 and 19.

Figure 9:
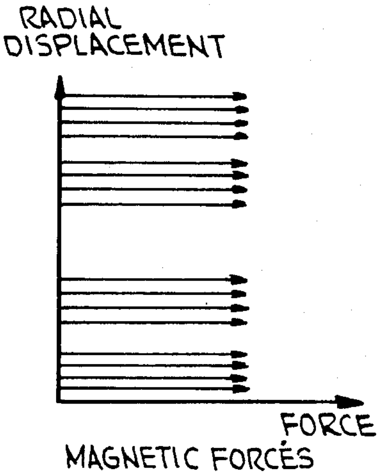
FIG. 9 is a plot of the magnetic force distribution produced on the seal cartridge by the magnetic seal.

The pressure distribution in the centrifugal seal fluid at operating speed, illustrated in FIGS. 6 and 7, is a function of the radius of the rotating vane portion 14, the angular velocity of the shaft, the mass density of fluid 30, the radius of the inner fluid surface and the pressure differential between the high and low pressure regions $P_H$ and $P_L$, respectively. The static pressure distribution over surface A—A shown in FIG. 5 is due to the total pressure differential $P_H - P_L$. An additional force acting to axially displace cartridge 16 results from the spring 45 which tends to displace the cartridge toward the left as viewed in FIG. 1. Finally, the magnetic force distribution illustrated in FIG. 9 is a function of the size of the air gap between the pole piece 18, 19 and surface 17 during high speed operation, as well as a function of the flux density. In order to balance all of these forces at any given operating condition, the sum of the leftward-directed forces should equal the sum of the rightward-directed forces. This balance is achieved by movement of the cartridge to adjust the leakage film thickness between wall 27 and surface 31 and hence the magnitude of the hydrodynamic pressure component in FIG. 8. The net effect is to maintain the seal cartridge 16 positioned so that none of the cartridge surfaces contact any of the surfaces of collar member 13 and vane portion 14. Included in these operating conditions when axial balance is required is the zero and low speed operation during which the centrifugal seal is not in effect. Under such circumstances, only the forces illustrated in FIGS. 5 and 9, along with the force resulting from spring 45, are applied in an axial direction to cartridge 16. For such conditions the force applied by the spring must equal the difference between the magnetic force and the force due to the gaseous pressure differential $P_H - P_L$.

Figure 2:
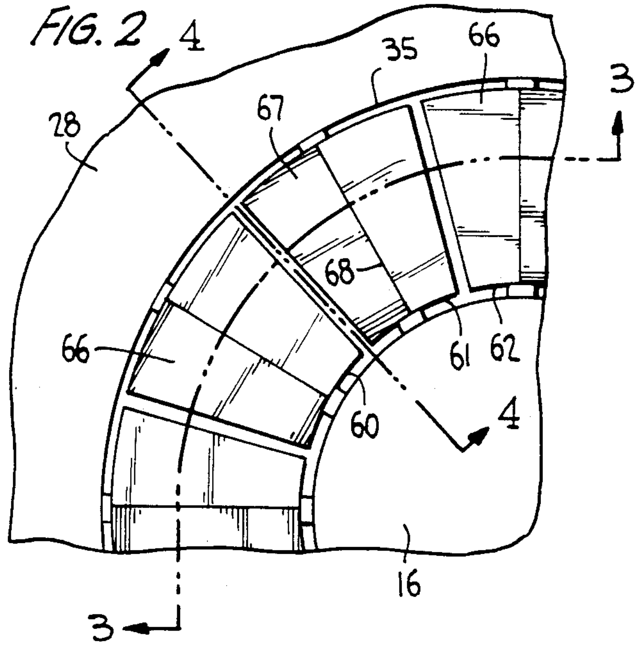
FIG. 2 is a partial detailed plan view in elevation of an alternative hybrid arrangement employed in place of the hydrostatic bearing illustrated in FIG. 1.
Figure 4:
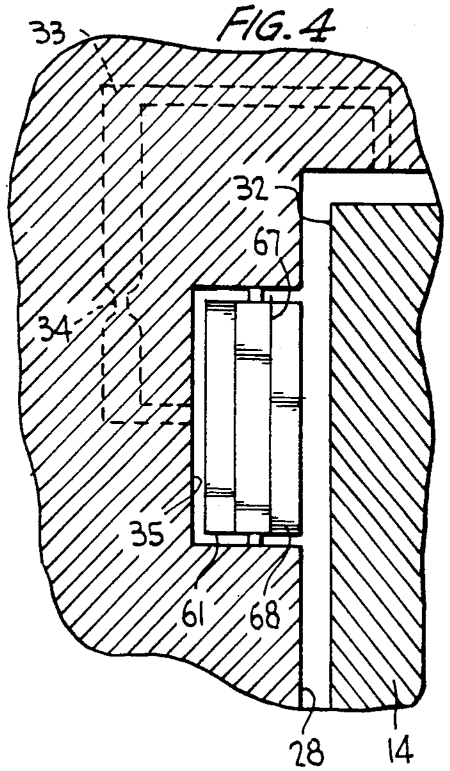
FIG. 4 is a view in section taken along lines 4—4 of FIG. 2.
Figure 3:
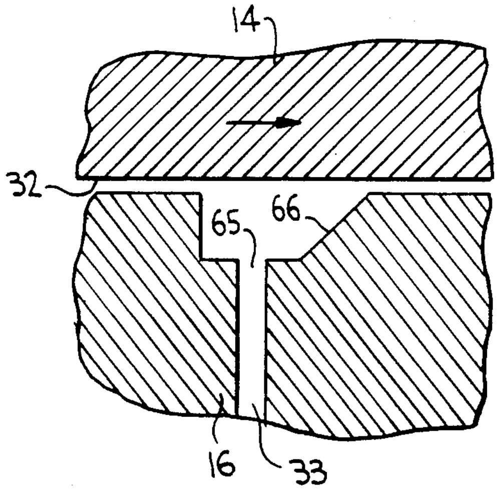
FIG. 3 is a view in section taken along lines 3—3 of FIG. 2.
Figure 3A:
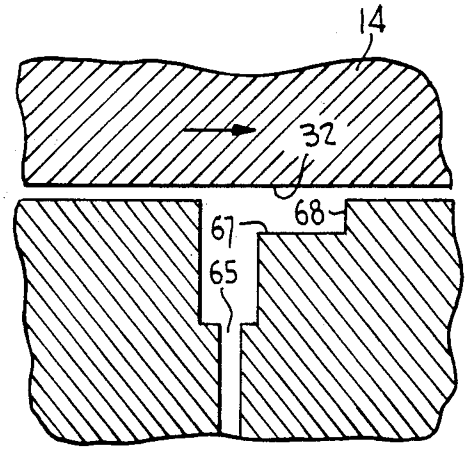
FIG. 3A is an alternative stepped construction for the tapered bearing pads shown in FIG. 3.
Figure 10:
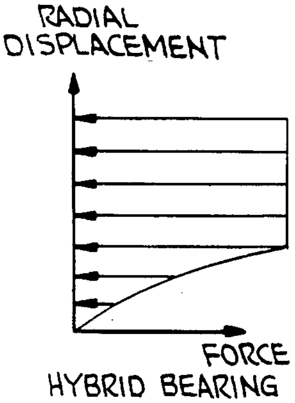
FIG. 10 is a plot of the pressure distribution on the seal cartridge produced by the hybrid bearing of FIGS. 2-4.

The simple hydrostatic bearing illustrated and described in relation to FIG. 1, and for which the pressure distribution plot is illustrated in FIG. 8, may be replaced by a hybrid bearing of the type generally illustrated and described in the aforementioned Wilcock Patent No. 3,785,215. The hybrid bearing is illustrated in FIGS. 2–4 and its pressure distribution curve is illustrated in FIG. 10. A hybrid bearing is a combined hydrostatic and hydrodynamic bearing in which hydrodynamic load-supporting elements are inserted within the pressurized areas of the hydrostatic bearings thereby increasing the cavity pressure. Specifically, a series of angularly spaced dynamic bearing pads 60, 61, 62, etc. are supported in annular recess 35 defined in bearing surface 28. Alternative configurations of the bearing surfaces of the pads are shown in FIG. 3 as being tapered and in FIG. 3A as being stepped. Centrifugal fluid delivered from passage 33 is issued axially into the bearing region through nozzles 65 defined in the cavity spaces. The nozzles 65 may extend radially so that the fluid is issued over the entire bearing surface of the pads. As shown in FIG. 3, when tapered pads are employed the taper is in the direction of rotation of vane portion 14 so as to reduce the space between the bearing pad and bearing surface 32 of the vane portion in the direction of rotation. The tapered portion of the pad surface is generally designated by the numeral 66. As shown in FIG. 3A, when stepped pads are employed the pad 61 includes a recess at its forward end generally designated by the reference numeral 67. The recess terminates in a radially extending shoulder 68 defining a shallow step beyond which the spacing between the pad 61 and bearing surface 32 is considerably reduced.

As the load forces increase during rotational acceleration of the shaft and vane portion 14, a fluid pressure is generated and/or developed in the nozzle regions 65 by the feeding of centrifugal seal fluid from the centrifugal seal region via passage 33. In addition, the pressure is increased by the hydrodynamically generated pressure between the bearing pads and the bearing surface 32 of vane portion 14. More particularly, as vane portion 14 rotates, it drags the centrifugal seal liquid across the leading portions 66, 67 of the bearing pads. Since the tapered space adjacent tapered portion (or the stepped region 67) are filled with centrifugal seal liquid, the drag exerted on the liquid by the vane portion 14 compresses the liquid in such region to a pressure which corresponds to the load carried by the rotating vane portion. The pressure build-up in the bearing acts to move the cartridge 16 to compensate for relative movement between the cartridge and the vane portion 14.

Referring to the operation of the hybrid bearing more particularly, the tapered land design is particulary suitable for machinery where high thrust forces are encountered. The shrouded step design, on the other hand, is also applicable to high thrust engines because of its combination of good hydrodynamic action with a hybrid capability. Generally, a number of pads of the same general shape are to be arranged in an annular array. During operâtion, motion of the vane portion 14 drags fluid across the tapered region 66 (or stepped region 67) toward the narrowed space between the bearing pad and surface 32. In this manner, fluid pressures develop along the tapered or recessed surfaces, reaching a maximum at the end of the taper 66 at shoulder 68. The pressure of the liquid delivered via passage 33, combined with the hydrodynamic action, developes a total pressure which equals or exceeds the load imposed on the bearing so that the cartridge 16 seeks a position which corresponds to a balance of the sum of the axial forces. For a more detailed disclosure of the manner in which this hydrodynamic pumping and pressurizing action takes place, reference is made to the aforementioned Wilcock et al. U.S. Pat. No. 3,785,215 and to the textbook by Wilcock and Booser entitled, "Bearing Design and Application" 1957 edition, McGraw-Hill Book Company. The hydrodynamic pumping action, in any case, provides a higher bearing load capacity than the simple hydrostatic bearing.

We have disclosed an improved gas seal which combines with a bearing structure to compensate for excursion of a rotating shaft. The seals are particulary applicable for contra-rotating shafts and/or for a rotor with excessive axial motion. The seals described herein are capable of handling large amounts of axial and radial shaft excursion. An important feature of the invention is the delivery of fluid to a bearing region at a pressure which is dependent upon the rotational speed of one member forming the bearing so as to compensate for axial displacement between the members. As disclosed, the pressurized fluid which is pressurized in accordance with the rotational speed of the rotating member is derived from a centrifugal seal in which the fluid pressure responds to the rotational speed. An axially displaceable cartridge serves as the non-rotating member and provides one surface of a hydrostatic or hybrid bearing. The bearing serves to guide the seal cartridge so that it follows both positive and negative axial shaft excursions which occur due to dynamic play in the thrust bearing or due to differential thermal expansion.

Various modifications may be made to the specific embodiments disclosed without departing from the true scope of the invention. For example, as noted above, spring 45 is employed mainly to balance the magnetic force on the seal cartridge and its spring constant depends upon the particular application with which the seal is used and the location of the permanent magnets. The location of spring 45 may be changed to reverse the resultant direction of the spring force for a particular application. A significant static force can be developed to effect displacement of the cartridge (the static pressure due to the change in pressure across the seal which is distributed over the surface 17 at zero and low-speed operation, and at higher speed operation over surface A—A). The magnitude of the static force can be sized by selecting proper diameters for the collar member 13 at its section opposite magnet 20 and at its section on the high pressure side of reservoir 25.

Having described several embodiments of a new and improved seal assembly constructed in accordance with the present invention, it is believed obvious that other modifications and variations of the invention are possible in view of the descriptions set forth above. It is therefore to be understood that changes may be made in the particular described embodiments, which changes are within the full intended scope of the invention as defined by the appended claims.

What is claimed is:

1. A seal assembly for hermetically sealing the space between a rotating member subject to axial and radial displacement due to thermal heating and thrust loads and a close-fitting spaced apart non-rotating member comprising:

a circumferentially arranged centrifugal seal forming region located between said rotating and non-rotating members.

means in flow communication with said centrifugal seal forming region for receiving and pooling centrifugal seal fluid such that the fluid is centrifugally thrown radially outwardly during high speed rotation of said rotating member into said centrifugal seal forming region, fluid film bearing means for providing a fluid film bearing between said rotating and non-rotating members, said fluid film bearing means comprising first and second closely spaced-apart bearing surfaces formed on said rotating and non-rotating members, respectively, and flow passage means connected from said centrifugal seal forming region to the space between said first and second bearing surfaces and responsive to rotation of said rotating member for delivering said centrifugal sealing fluid to the space between said first and second bearing surfaces at a pressure which varies as a function of the rotational speed of said rotating member to thereby increase the fluid pressure between said first and second bearing surfaces with increasing rotational speed of said rotating member, and said non-rotating member comprising means responsive to the balance of forces acting between it and the rotating member and said rotating member comprising means, being axially movable to maintain the relative close clearance conditions between it and the rotating member required in the seal forming region.

2. A seal assembly according to claim 1 wherein said fluid film bearing means is a hydrostatic bearing.

3. A seal assembly according to claim 1 wherein said fluid film bearing means is a hybrid hydrodynamic-hydrostatic bearing.

4. A seal according to claim 1 wherein said rotating member is a shaft arranged to rotate about its longitudinal axis, wherein said non-rotating member is an axially movable seal cartridge member disposed substantially concentrically about said shaft, and further comprising:

a rotor housing within which said shaft is rotatable and said seal cartridge member is mounted, and means securing said seal cartridge member to said rotor housing for limited axial displacement therein relative to said housing for maintaining the relatively close clearance condition between the shaft and the seal cartridge member required in the seal forming region during axial shaft excursions due to thermal heating and thrust loads, said first bearing surface being formed on a generally annular collar surface projecting substantially radially outward from said shaft, and said second bearing surface being a generally annular surface of said seal cartridge member disposed substantially parallel to and in closely spaced-apart relation with said first bearing surface.

5. A seal assembly according to claim 4 further comprising:

key means for preventing rotation of said cartridge member relative to said rotor housing, said key means including a key recess defined in the periphery of said cartridge member, and a key member secured to said rotor housing and projecting into said key recess.

6. A seal assembly according to claim 4 wherein said flow passage means is defined in said seal cartridge member and wherein said second bearing surface includes an annular ingress recess disposed in flow communication with said flow passage means for receiving the centrifugal sealing fluid delivered by said flow passage means and distributing the received fluid to a location between said first and second bearing surfaces.

7. A seal assembly according to claim 6 wherein said centrifugal seal forming region comprises an annular cavity defined in said seal cartridge member, an annular collar member secured to and projecting radially from said shaft into said cavity, wherein said first bearing surface is a surface of said annular collar member, and wherein said second bearing surface is a surface of said cavity.

8. A seal assembly according to claim 7 wherein said flow passage means includes at least one flow passage connected to receive said centrifugal sealing fluid from a radially outermost part of said cavity and includes a pressure-dropping flow restricter for limiting the pressure of fluid delivered between said first and second bearing surfaces.

9. A seal assembly according to claim 8 wherein said fluid film bearing means is a hybrid hydrodynamic-hydrostatic bearing wherein a series of angularly spaced bearings pads are disposed in said annular ingress recess in said bearing surface, each bearing pad having a pad surface which faces said first bearing surface and which is contoured to increase the pressure of the fluid between the pad surface and the first bearing surface as the rotating first bearing surface drags the fluid past the bearing surface.

10. A seal assembly according to claim 9 wherein a plurality of said bearing pads have their pad surfaces configured with a radially-extending step defining two angularly adjacent sections of different axial thickness such that the spacing between the pad surface and the first bearing surface decreases in the direction of rotation of the collar member.

11. A seal assembly according to claim 9 wherein a plurality of said bearing pad surfaces are tapered in an angular direction to reduce the space between the pad surface and the first bearing surface in the direction of rotation of said collar member.

12. A seal assembly according to claim 9 further comprising a magnetic seal defined between said cartridge member and said rotating member, said magnetic seal comprising at least one magnetic pole-like close clearance magnetic seal gap region between third and fourth opposed surfaces of the cartridge and rotating members, respectively, a high viscosity magnetically permeable magnetic fluid normally disposed in said magnetic gap region with said rotating member at rest or low rotational speeds, and magnetic field producing means magnetically coupled to at least portions of said rotating and cartridge members, to said magnetic seal gap region, and to said high viscosity magnetically permeable magnetic fluid in a closed magnetic circuit.

13. A seal assembly according to claim 12 further comprising a plurality of magnetic pole-like teeth forming a plurality of close clearance magnetic gap regions between the third and fourth opposed surfaces of the rotating and cartridge members which coact to form a multiple stage magnetic seal while said rotating member is at rest and during slow speed rotation thereof, wherein the high viscosity magnetically permeable fluid comprises a ferric suspension in a suitable carrier liquid having low viscosity and strong saturation magnetization characteristics, and wherein both the magnetically permeable fluid and the lower viscosity centrifugal fluid are immiscible with respect to each other and to other fluids being sealed, and further comprising spring means for positionally biasing said cartridge member axially of said shaft member to balance axial forces exerted between said cartridge and shaft members by said magnetic seal.

14. A seal assembly according to claim 1, comprising a second seal means in series with the centrifugal seal and the leakage path and being operative to provide sealing at low speed operation and at zero speed.

15. The seal assembly according to claim 14 wherein said second seal means is a magnetic fluid seal.

16. A seal assembly according to claim 15 wherein said magnetic seal comprises at least one magnetic pole-like close clearance magnetic seal gap region between third and fourth opposed surfaces of the cartridge and rotating members, respectively, a high viscosity magnetically permeable magnetic fluid normally disposed in said magnetic gap region with said rotating member at rest or low rotational speeds, and magnetic field producing means magnetically coupled to at least portions of said rotating and cartridge members, to said magnetic seal gap region, and to said high viscosity magnetically permeable magnetic fluid in a closed magnetic circuit.

17. A seal assembly according to claim 16 further comprising a plurality of magnetic pole-like teeth forming a plurality of close clearance magnetic gap regions between the third and fourth opposed surfaces of the rotating and cartridge member which coact to form a multiple stage magnetic seal while said rotating member is at rest and during slow speed rotation thereof;

wherein the magnetically permeable fluid has strong saturation magnetization characteristics, and wherein both the magnetically permeable fluid and the lower viscosity centrifugal fluid are immiscible with respect to each other and to other fluids being sealed, and further comprising spring means for positionally biasing said cartridge member axially of said shaft member to balance axial forces exerted between said cartridge and shaft members by said magnetic seal.

18. A seal according to claim 1 wherein the centrifugal sealing fluid comprises the lubricating oil of an apparatus or machine on which the seal is used with means for receiving and pooling the centrifugal sealing fluid being included in and comprising a part of the lubricating oil cooling and supply system for the machine.

19. A plural fluid magnetic/centrifugal-fluid seal for hermetically sealing the space between a rotating member and a close fitting spaced-apart non-rotating member capable of limited axial movement comprising means formed on said members defining at least one magnetic pole-like close clearance magnetic seal gap region between opposed surfaces of the members, a high viscosity magnetically permeable magnetic fluid normally disposed in said magnetic gap region with said rotating member at rest or low rotational speeds, magnetic filed producing means magnetically coupled to at least portions of said rotating and non-rotating members, to said magnetic seal gap region, and to said high viscosity magnetically permeable magnetic fluid in a closed magnetic circuit, a circumferentially arranged centrifugal seal forming region radially disposed outwardly from said magnetic seal gap region and located between the rotating and non-rotating members, means in communication with said centrifugal seal forming region for receiving and pooling a low viscosity centrifugal sealing fluid, said centrifugal sealing fluid being centrifugally thrown outwardly during high speed rotation of said rotating member into said centrifugal seal forming region to thereby form a centrifugal hermetic seal through the medium of the fluid pooled between the two members by centrifugal force at high rotational speeds of said rotating member, fluid film bearing means for mutual axial providing a fluid film bearing between said rotational and nonrotating members, said fluid film bearing means comprising first and second closely spaced-apart bearing surfaces of said rotating and non-rotating members, respectively, flow passage means connected from said centrifugal seal forming region to between said first and second bearing surfaces and responsive to rotation of said rotating member for delivering said centrifugal sealing fluid to between said fist and second bearing surfaces at a pressure which varies as a function of the rotational speed of said rotating member to increase the fluid pressure between said first and second bearing surfaces with increasing rotational speed of said rotating ember, and said non-rotating member responsive to the balance of forces acting between it and the rotating member being axially movable to maintain the relatively close clearance conditions between it and the rotating member required in the seal forming regions.

20. A seal assembly according to claim 19 wherein said fluid film bearing means is a hydrostatic bearing.

21. A seal according to claim 19 wherein said fluid film bearing means is a hybrid hydrodynamic-hydrostatic bearing.

* * * * *

UNITED STATES PATENT AND TRADEMARK OFFICE
CERTIFICATE OF CORRECTION

PATENT NO. : 4,671,677

DATED : 06/09/87

INVENTOR(S) : Hooshang Heshmat & Donald Wilcock

It is certified that error appears in the above-identified patent and that said Letters Patent are hereby corrected as shown below:

Column 3, line 47, insert after "hybrid" the word --bearing--.

Column 4, line 66, change "configuraton" to --configuration--.

Column 5, line 50, change "29" to --39--.

Column 7, line 51, change "exsisting" to --existing--;

line 55, change "cartridde" to --cartridge--.

Column 9, line 52, change "particulary" to --particularly--.

Signed and Sealed this

Twentieth Day of October, 1987

*Attest:*

DONALD J. QUIGG

*Attesting Officer*

*Commissioner of Patents and Trademarks*